June 22, 1926.                                                  1,589,470
                            H. H. HOOD
                PRESSURE INDICATOR FOR PNEUMATIC TIRES
                        Filed Dec. 31, 1921
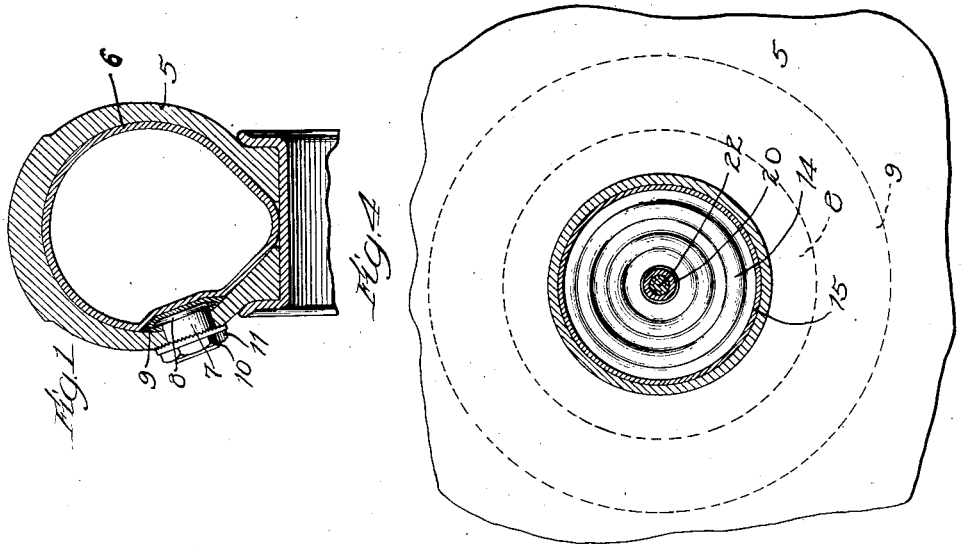
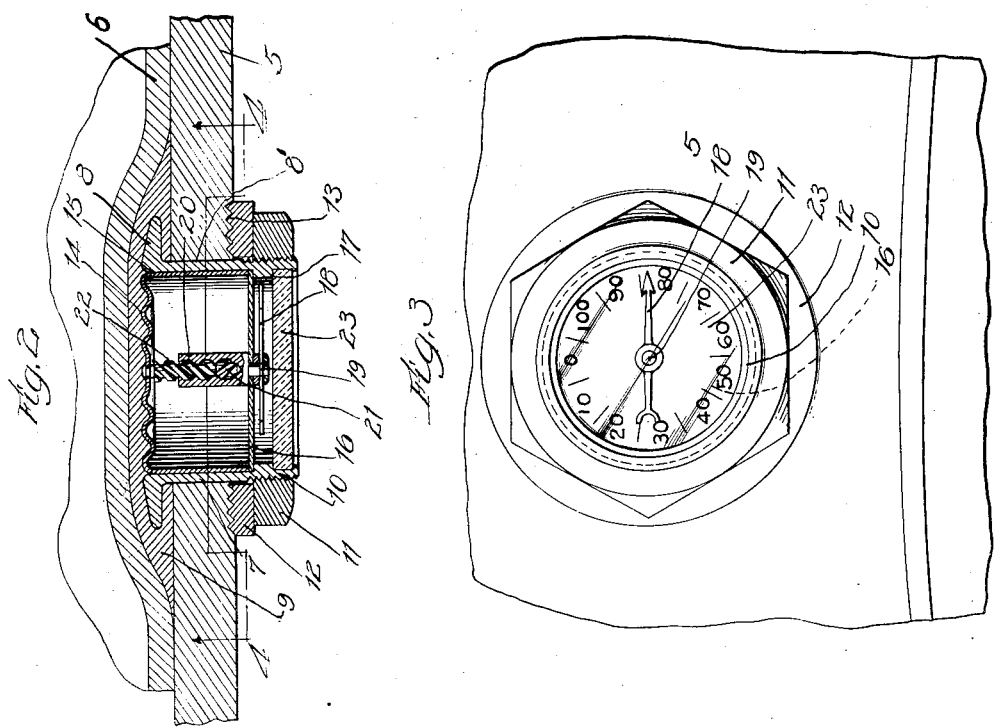
Inventor:
Harry H. Hood
By Fred Gerlach
      his Atty Patented June 22, 1926.

1,589,470

UNITED STATES PATENT OFFICE.

HARRY H. HOOD, OF CHICAGO, ILLINOIS.

PRESSURE INDICATOR FOR PNEUMATIC TIRES.

Application filed December 31, 1924. Serial No. 526,195.

The invention relates to pressure indicators for pneumatic tires.

One object of the invention is to provide a simple and efficient indicator for pneumatic tires. One characteristic of the invention is that an indicator support or body is secured directly in one of the side portions of the pneumatic tire casing, so that a diaphragm or indicator operating element will be supported in position to be operated by the fluid pressure in the tire. By providing an indicator in the casing itself, the necessity of providing a fluid conducting connection between the inside of the tube and the indicator will be avoided. Other objects of the invention will appear from the specification.

The invention consists in the several novel features hereinafter set forth and more particularly defined by claims at the conslusion hereof.

In the drawings: Fig. 1 is a section of a pneumatic tire embodying the invention, the indicator being shown in elevation. Fig. 2 is a section of the indicator upon an enlarged scale. Fig. 3 is a side elevation. Fig. 4 is a section taken on line 4—4 of Fig. 2.

The invention is exemplified in a pneumatic tire comprising a casing 5 and a pneumatic tube 6 fitting therein. The tube is inflatable through the usual check-valve, as well understood in the art. The indicator comprises a cylindrical body 7 which is passed through a correspondingly shaped hole 8' which is punched through one side of the casing 5. Body 7 is provided with a flange 8 adjacent its inner end and this flange and the inner end of the body are covered with a rubber cushion 9 in which the flange is embedded to protect the inner tube from abrasion and wear by the body 7. The indicator body or support 7 is provided at its outer end with a screw-thread 10 for a nut 11 which is adapted to bear against a washer 12, so that the indicator body will be securely held and clamped in the casing 5. The inner face of the washer 12 is provided with teeth or ribs 13 to better secure the washer against movement relatively to the casing. A metallic diaphragm 14 closes the inner end of the indicator body 7 and is provided with a cylindrical portion or flange 15 which fits snugly in the bore of said body. The diaphragm 14 is suitably corrugated, so that it will be flexible and will be shifted axially of the support responsively to fluid pressure in the pneumatic tube 6. That is to say, as the pressure in the tube increases, the diaphragm 14 will be forced outwardly. The diaphragm is resilient so that it will automatically retract itself when the pressure decreases.

A dial 16 is secured between a shoulder 17 adjacent the front end of body 7 and the outer end of the flange 15. An index or pointer 18 is secured to a shaft 19 which is journalled in the dial 16 and is rigid with a socket 20 formed with a helical female groove or screw-thread 21. A helically grooved or threaded post 22 is slidably fitted in the socket 20 and its inner end is fixedly and non-rotatably secured to the diaphragm 14. The socket 20 and shaft 19 are held against axial movement in the dial 16 and, as a result, when the diaphragm is operated outwardly or inwardly responsively to pressure fluctuations in the tube 6, the post 22 will be shifted longitudinally. Longitudinal movement of the post 22 will force the socket 20 and the pointer 18 to rotate so that the pressure in the tube will be indicated on said dial. A transparent plate 23 is suitably secured in the outer end of the body 7 to protect the dial and pointer.

The invention exemplifies a pressure indicator for tires which is operable without being connected to the fluid in the pneumatic tube. The indicator may be readily secured in any tire casing. The indicator is entirely independent of the check-valve and its casing usually connected to the inner tube. The indicator is simple in construction, may be produced at a low cost and is efficient in operation, because it is operable by the outside of the pneumatic tube.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a pneumatic tire casing, of a pressure indicating device comprising a body member extending through a hole in one side of the casing, means for securing the member to the casing, a diaphragm disposed inside the casing and secured adjacent the inner end of said member, said diaphragm being responsive to variations in pressure of the fluid in said casing, and mechanical means disposed in the body and operated by said diaphragm for indicating the amount of pressure in said casing.

2. The combination with a pneumatic tire casing and an inflatable tube, of a pressure indicating device comprising a body member extending through a hole in one side of the casing, means for securing the member to the casing, a diaphragm disposed within the casing and adjacent the tube and secured to the inner end of the body member, said diaphragm being responsive to variations in the pressure of the fluid in the tube, and mechanical means disposed in said member and operated by said diaphragm for indicating the amount of pressure in the tube.

3. The combination with a pneumatic tire comprising a casing and an inflatable tube, of a pressure indicator comprising a supporting body extending through a hole in one side of the casing, means for securing said body to the casing, a diaphragm mounted within said tire and in the inner end of said body, an elastic cushion between and engaging said diaphragm and tube, said diaphragm being responsive to the changes in pressure of the fluid in said tube, and means actuated by said diaphragm for indicating the amount of pressure in said tube.

4. The combination with a pneumatic tire comprising a casing, of a pressure indicator comprising a supporting body extending through a hole in one side of the casing, an outwardly extending peripheral flange formed on the inner end of said supporting body and within the casing, a diaphragm mounted at the inner end of said body, an elastic cushion covering said diaphragm and in which the peripheral flange is embedded, means for securing said body to the casing, and means operable by said diaphragm to indicate the pressure fluctuations of fluid in the tire.

5. The combination with a pneumatic tire comprising a casing, of a pressure indicator comprising a supporting body extending through a hole in one side of the casing, an indicator operating element mounted in the body and inside of the tire and responsive to pressure fluctuations in said tire, and means for securing said body to the casing comprising a toothed ring disposed adjacent the outside of the casing and around the portion of the supporting body which extends on the outside of the casing, and a nut rotatably mounted on the outer end of said body.

HARRY H. HOOD.